United States Patent
Inaba

(12) 
(10) Patent No.: US 6,295,418 B1
(45) Date of Patent: Sep. 25, 2001

(54) STEREO SLIDE MOUNT AND STEREO CAMERA

(76) Inventor: Minoru Inaba, No. 1116, Oaza Samukawa, Oyama-shi, Tochigi-ken (JP)

( * ) Notice: Subject to any disclaimer, the term of this patent is extended or adjusted under 35 U.S.C. 154(b) by 0 days.

(21) Appl. No.: 09/426,082

(22) Filed: Oct. 22, 1999

(51) Int. Cl.[7] ............................................. G03B 35/00
(52) U.S. Cl. ................................... 396/324; 353/120
(58) Field of Search ......................... 353/120; 396/322, 396/324–331

(56) References Cited

U.S. PATENT DOCUMENTS

| | | |
|---|---|---|
| 2,292,312 | 8/1942 | Wittel et al. . |
| 2,739,401 | 3/1956 | Balter . |
| 2,823,478 | 2/1958 | Ostergaard et al. . |
| 2,842,883 | 7/1958 | Folwell et al. . |
| 3,133,368 | 5/1964 | Perrot . |
| 3,235,991 | 2/1966 | Harper et al. . |
| 3,242,605 | 3/1966 | Kleinschmidt . |
| 3,389,485 | 6/1968 | Roubal . |
| 3,808,722 | 5/1974 | Byers et al. . |
| 4,104,818 | 8/1978 | Hrabik . |
| 4,132,480 | 1/1979 | Reed . |
| 4,314,416 | 2/1982 | Lorsch . |
| 4,431,282 | 2/1984 | Martin geb. Boser . |
| 4,942,684 | * 7/1990 | Oehmichen .......................... 353/120 |
| 5,392,548 | 2/1995 | Truc et al. . |
| 5,685,626 | 11/1997 | Inaba . |
| 5,715,489 | 2/1998 | Inaba . |
| 5,737,655 | 4/1998 | Inaba . |
| 5,778,268 | 7/1998 | Inaba . |
| 5,892,994 | 4/1999 | Inaba . |

\* cited by examiner

*Primary Examiner*—David M. Gray
(74) *Attorney, Agent, or Firm*—Fattibene & Fattibene; Paul A. Fattibene; Arthur T. Fattibene

(57) ABSTRACT

A stereo slide mount capable of correctly adjusting the pitch between the films. Horizontal guide grooves 14R and 14L are formed on the lower side of the right and left windows of a base frame 11 of the stereo slide mount, and film holder bars 15R and 15L are fitted into the guide grooves. Verniers are graduated on the right and left film holder bars under the right window and the left window of the base frame. Cam shafts are turned by being inserted in the bearing holes 18 formed at the ends on the inner sides of the guide grooves, whereby the film holder bars are slid outward to correctly adjust the offset amounts relying on the verniers. After the adjustment, perforations at both ends of the films are engaged with the bosses 16 of the film holder bars so as to be placed in position, and a cover frame 1 is mounted on the base frame 11.

16 Claims, 8 Drawing Sheets

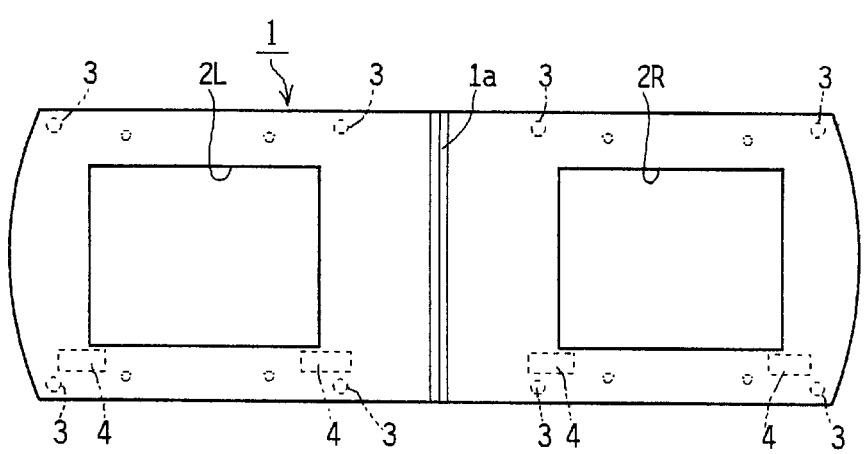
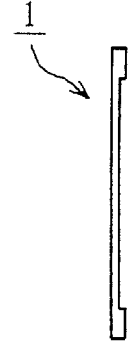
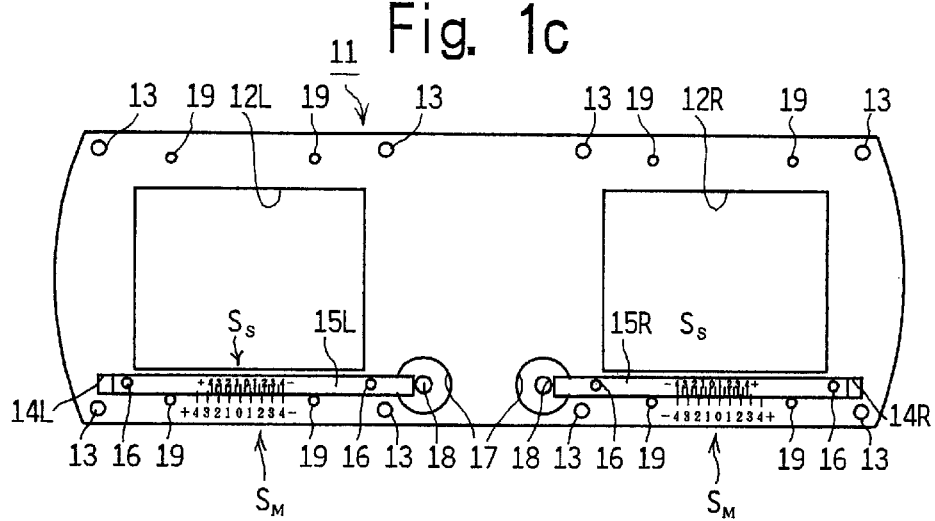
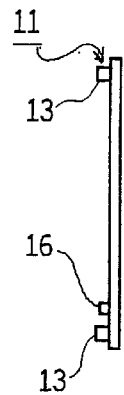

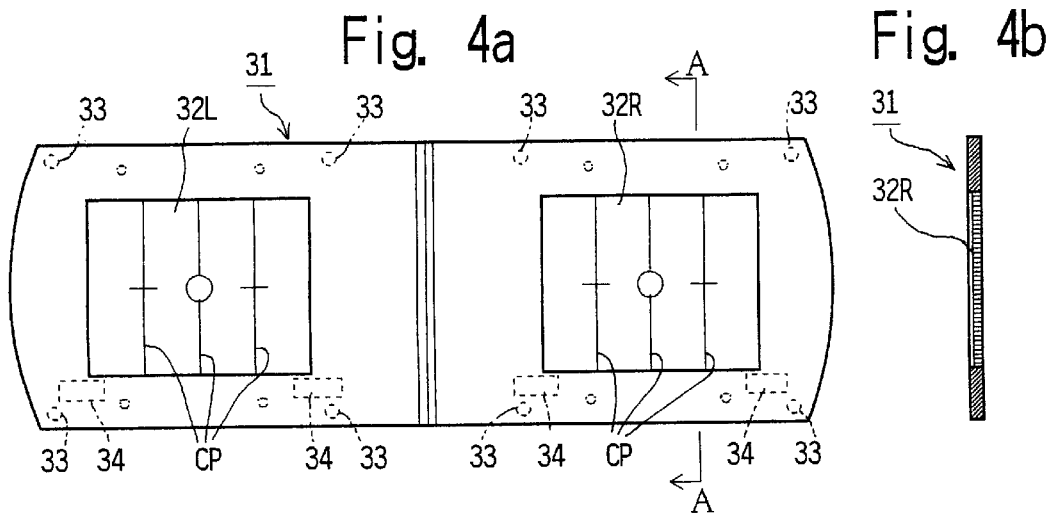

CHART 1

| GUIDE No. | FILM PITCH OFFSET (mm) | FOCUSING DISTANCE (mm) | CORRECTED FOCUSING RANGE (mm) |
|---|---|---|---|
| −4 | −2.0 | 5935 | 6600 − ∞ |
| −3 | −1.5 | 2620 | 2900 − 6599 |
| −2 | −1.0 | 1690 | 1860 − 2899 |
| −1 | −0.5 | 1253 | 1400 − 1859 |
| 0 | 0 | 999 | 1100 − 1399 |
| 1 | +0.5 | 832 | 900 − 1099 |
| 2 | +1.0 | 715 | 780 − 899 |
| 3 | +1.5 | 627 | 690 − 779 |
| 4 | +2.0 | 560 | 600 − 689 |

STEREO SLIDE MOUNT AND STEREO CAMERA

BACKGROUND OF THE INVENTION

1. Field of the Invention

The present invention relates to a stereo slide mount capable of adjusting the pitch for mounting the right and left films, and to a stereo camera capable of recording data related to the pitch for mounting the films.

2. Description of the Prior Art

In almost all stereo cameras, the distance between the optical axes of the right and left photographing lenses has been fixed, and the photographing ranges of the right and left photographing lenses come into agreement at an infinite point. In these stereo cameras of the type in which the distance between the optical axes is fixed, the pitch between the same subjects on the right and left photographed pictures varies depending upon the distance to the subject, the pitch between the subjects at an infinite point is equal to the pitch between the right and left pictures, and the pitch between the subjects becomes larger than the pitch between the pictures as the distance to the subject decreases.

The image on the photographed pictures has been inverted upside down and right side left. Therefore, the right and left films are mounted on a stereo slide mount in a state of an erect image of being turned by 180 degrees, respectively. In this case, when the right and left films are mounted with the pitch between the pictures of the right and left films being in agreement with the pitch between the right and left windows of the stereo slide mount, the pitch between the subjects in a close range becomes smaller than the pitch between the right and left windows.

When the stereo slide mount of this state is viewed by using a stereo slide viewer, the stereo image of the subject in a close range appears in front of the stereo window (aerial image which appears as a single window as the right and left windows of the stereo slide mount come into agreement) producing unnatural perspective feeling and causing fatigue to the eyes.

In order that the image of the subject at the closest range appears at a distance same as, or slightly farther than, the stereo window, therefore, the pitch must be adjusted between the right and left films, and the pitch between the subjects in the closest range must be set to be larger than the pitch between the right and left windows of the stereo slide mount.

There have also been known a stereo camera in which the distance between the optical axes of the right and left photographing lenses is automatically adjusted so that the photographing ranges of the right and left photographing lenses are brought into agreement at a focusing distance and a camera in which the distance between the optical axes of the right and left lenses is manually adjusted. In the stereo cameras of these types, too, it is desired that, when a body in front of the focusing distance is photographed, the right and left films are mounted while so adjusting the pitch that the image of the subject in the closest range appears at the same distance as, or slightly farther than, the stereo window.

However, the pitch between the films is adjusted in such a small amount that it is not easy to symmetrically adjust the horizontal offset amounts of the right and left films by judging the amounts of adjustment by naked eyes.

Thus, there arouses a technical problem that must be solved for easily and correctly adjusting the pitch between the films on the stereo slide mount. The object of the present invention therefore is to solve this assignment.

SUMMARY OF THE INVENTION

The present invention was proposed in order to achieve the above-mentioned object, and provides a stereo slide mount comprising a base frame and a cover frame, wherein the lateral widths of a pair of windows arranged on the right and left sides are set to be narrower than the lateral widths of the pictures of the films, horizontal guide grooves are formed over or under the right window and the left window of the base frame, film holder bars having bosses formed on the surfaces of the bars for engagement with the perforations of the films, are fitted into the right and left guide grooves in a manner that the gap between the two film holder bars can be adjusted, and the two film holder bars and the base frame are provided with graduates of different pitches thereby to constitute verniers, so that the offset amounts of the two film holder bars in the right-and-left direction can be read relying on the verniers.

The invention further provides a stereo camera equipped with right and left photographing lenses, comprising:

means for detecting the focusing distances of the photographing lenses;

means for finding the offset amounts of the films in order to correct a difference between the pitch across the right and left pictures and the pitch across the images of the subject at a focusing distance based on the distance between the optical axes of the right and left photographing lenses, focal distance thereof and focusing distance thereof; and a device for projecting a numerical value of the verniers of said stereo slide mount corresponding to the film offset amount that is found onto areas outside the pictures of the films.

BRIEF DESCRIPTION OF THE DRAWINGS

FIG. 1 illustrates a stereo slide mount, wherein FIG. 1a is a front view of a cover frame, FIG. 1b is a side view of the cover frame, FIG. 1c is a front view of a base frame, and FIG. 1d is a side view of the base frame;

FIG. 2 illustrates a cam shaft, wherein FIG. 2b is a view along the arrow A—A of FIG. 2a;

FIG. 3 illustrates verniers on the base frame, wherein

FIG. 4 illustrates collimation pattern mask, wherein FIG. 4a is a front view and FIG. 4b is a view along the line A—A in FIG. 4a;

DESCRIPTION OF THE PREFERRED EMBODIMENT

Figure 2A:
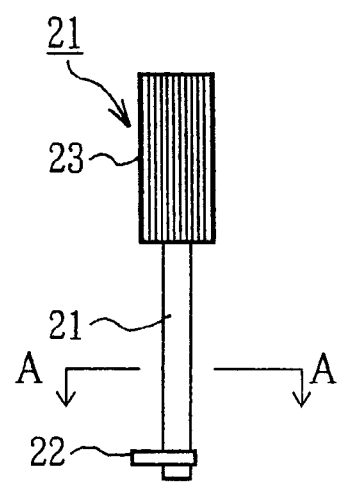
FIG. 2a is a front view.

An embodiment of the invention will now be described in detail with reference to the drawings. In the stereo slide mount of the present invention, the width of the windows is formed to be narrower than the width of the pictures, and the positions for mounting the films are adjusted in the right-and-left direction to correct the feeling of distance of the stereo image.

FIG. 1 illustrates a plastic cover frame 1 and a base frame 11 constituting the stereo slide mount and having windows 2R, 2L, 12R, 12L on the right and left sides thereof. The windows 2R, 2L, 12R, 12L have a vertical width equal to the vertical width of the pictures of the films, and have a lateral width slightly smaller than the lateral width of the pictures of the films. It is desired that the pitch between the right and left windows 2R, 2L, 12R, 12L is set to be about 62 mm to 63 mm, which is close to a pitch between two human eyes.

A plurality of pins 13 are studded on the upper edge portion and the lower edge portion of the base frame 11, and pin-holes 3 are fitted together, the base frame 11 and the cover frame 1 are coupled together.

The cover frame 1 and the base frame 11 have right and left ends of an arcuate shape. Unlike the stereo slide mount of a square shape, therefore, the mount can be easily inserted in the mount slot of the stereo slide viewer without any trouble. Further, the lateral width of the mount slit is selected to be the same as the lateral width of the stereo slide mount, to prevent the deviation in position of the stereo slide mount in the mount slot in the right-and-left direction.

A grooved hinge portion 1a is formed along the vertical direction at the center of the cover frame 1 in the right-and-left direction, enabling the cover frame 1 to be folded along the center. To mount the films, a film is set at a position of the left window 12L of the base frame 11, and the left half of the folded cover frame 1 is fitted to the base frame 11. Then, another film is set at a position of the right window 12R of the base frame 11, and the right half of the cover frame 1 is fitted to the base frame 11. Thus, the mounting operation is easy. Conversely, the base frame 11 may be folded.

Guide grooves 14R, 14L are formed on the lower side of the right and left windows 12R, 12L of the base frame 11 in the horizontal direction, and film holder bars 15R and 15L are fitted to the guide grooves 14R and 14L. The vertical width of the guide grooves 14R and 14L is the same as the vertical width of the film holder bars 15R and 15L, and the film holder bars are intimately fitted to the guide grooves and can be slid in the right-and-left direction by using a jig that will be described later.

Bosses 16 are provided near both the right and left ends of the film holder bars 15R and 15L to hold the films upon being engaged with perforations of the films, and recesses 4 are formed in the back surface of the cover frame 1 to avoid interference with the bosses 16 of the film holder bars 15R and 15L. For example, in the case of the stereo camera using the 135-type film having a frame of a lateral width equal to a perforation pitch of (4.735 mm)×7, the pitch between the bosses 16 of each film holder bar is set to be 4.735×7= 33.145 (mm) so that perforations at both ends of the film of a frame are engaged with the bosses 16.

Further, the film-feed mechanism of the stereo camera is so constituted that perforations are positioned in a gap portion between the pictures on the films, so that the center of perforations in the gap portion between the pictures serves as a position for cutting the film. The film is usually curled like an arch. The films cut into frames are placed on the windows 12R and 12L of the base frame 11, and the cover frame 1 is placed thereon; i.e., the curled films are pressed flat by the cover frame 1 and extend in the right-and-left direction, whereby perforations cut into halves at both ends of the films are naturally brought into engagement with the bosses 16 of the film holder bars 15R and 15L and are positioned.

The inner ends of the guide grooves 14R and 14L of the base frame 11 to which the film holder bars 15R and 15L are fitted, are expanding in a circular shape, and bearing holes 18 are formed at the centers of the circular holes 17.

The films can be positioned in the up-and-down direction by a variety of means without any limitation, such as providing positioning bosses 19 over and under the windows 12R and 12L of the base frame 11 as shown, or by forming a shallow horizontal groove having a width equal to the vertical width of the films in the central portion of the base frame in the up-and-down direction thereby to position the films by this horizontal groove.

Figure 2B:
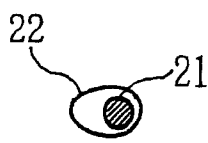

FIG. 2 illustrates a cam shaft 21 which is a jig for adjusting the positions of the films, having a cam 22 near an end thereof. A knob 23 at the upper end is turned by fingers so that the vertex of the cam 22 is directed to the center of the base frame 11 in the right-and-left direction, and the rotary center shaft 24 at the end is turned by being vertically inserted in the bearing hole 18 of the base frame 11, so that the cam 22 pushes the inner side surface of the film holder bar 15R, 15L to move it outward.

Further, in order to correctly adjust the positions of the film holder bars 15R and 15L, main graduates $S_M$ of vernier are printed under the left window and under the right window of the base frame 11 and vernier graduates $S_S$ are printed on the film holder bars 15R, 15L as shown in FIG. 1 to constitute two sets of right and left verniers.

Figure 3A:
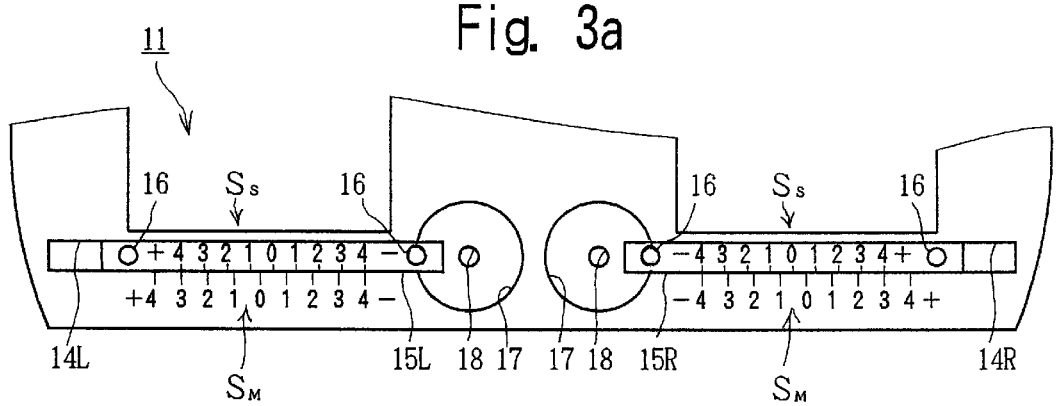
FIG. 3a is a view illustrating a position −4.
Figure 3B:
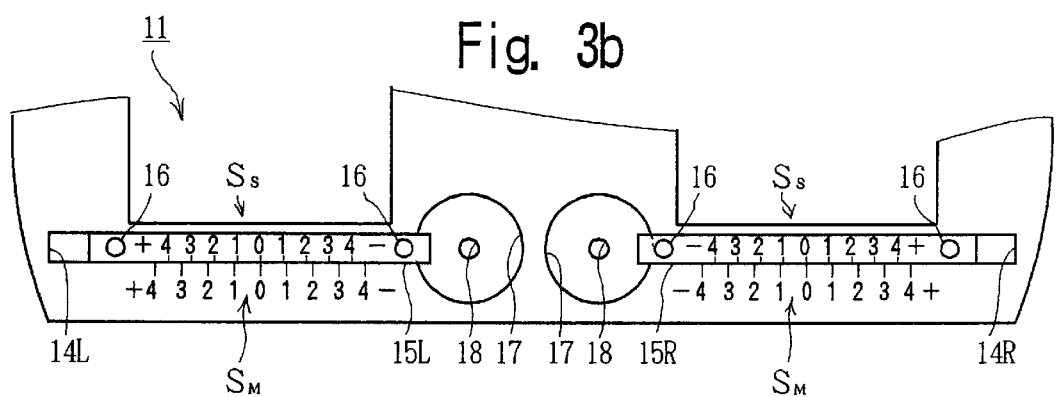
FIG. 3b is a view illustrating a position 0.

Referring to FIG. 3, the left vernier and the right vernier are symmetrically graduated, making it possible to correctly set the right and left film holder bars at symmetrical positions. FIG. 3 illustrates the graduates of verniers on an exaggerated scale. The vernier graduates $S_S$ of the film holder bars 15R, 15L and the main graduates $S_M$ of the base frame are graduated from −4 to +4 from the inner sides toward the outer sides. Referring to FIG. 3b, when 0 of the vernier graduate $S_S$ is brought into agreement with 0 of the main graduate $S_M$, the center pitch between the pictures of the films mounted on the right and left film holder bars 15R and 15L comes into agreement with the center pitch between the right and left windows 12R and 12L of the base frame 11. Further, when negative values are brought into agreement, the center pitch between the pictures on the films decreases and when the positive values are brought into agreement, the center pitch between the pictures on the films increases.

Here, if the unit amount of adjustment of the diagramed vernier divided into 8 is 0.25 mm, then, the range of offset adjustment of the films becomes ±1 mm. Therefore, when the film has an effective picture width of 32 mm, the width of the windows of the stereo slide mount may be set to be 30 mm. Then, portions outside the pictures of the films do not appear in the windows of the stereo slide mount despite the films are offset to a maximum degree toward the inner sides or toward the outer sides.

Figure 3C:
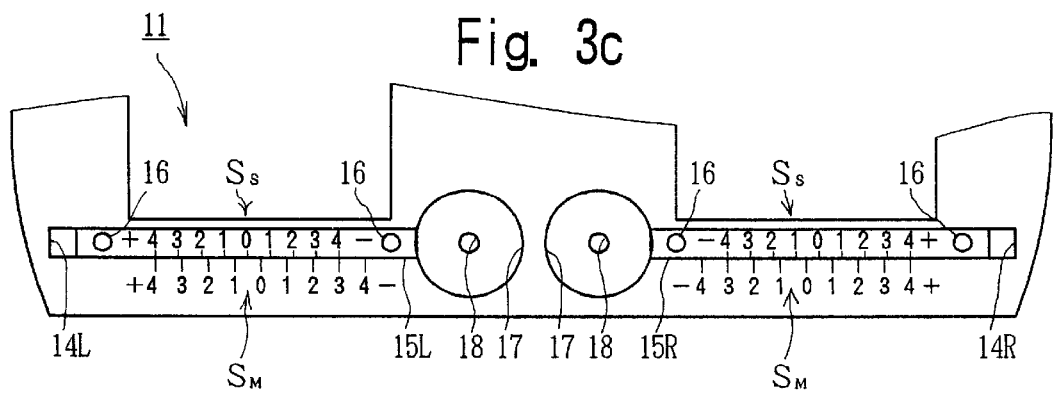
FIG. 3c is a view illustrating a position +4.

When 0s of the verniers are brought into agreement, the offset amount of the films is zero with respect to the windows of the stereo slide mount. When −4s of the verniers are brought into agreement to bring the right and left film holder bars 15R and 15L closest to each other as shown in FIG. 3a, the offset amount of one film is −1 mm. Therefore, the pitch between the right and left films becomes narrower than the pitch between the right and left windows of the stereo slide mount by 2 mm. When +4s of the verniers are brought into agreement with each other so that the right and left film holder bars 15R and 15L are most separated away from each other as shown in FIG. 3c, the pitch between the right and left films becomes larger than the pitch between the windows of the stereo slide mount by 2 mm.

When the right and left film holder bars 15R and 15L are moved toward the outer sides by using the cam shafts 21 from a state where −4s of the verniers are in agreement, the pictures of the films move toward the outer sides relative to the windows 12R and 12L of the base frame 11, whereby the pitch of the subject between the right and left pictures increases, and the distance of the stereo image moves into a distance when it is viewed by using a stereo slide viewer.

The pitch between the right and left films is so adjusted that the subject in the closest range appears at a distance equal to, or slightly farther than, the stereo window (aerial image that appears as a single window as the right and left windows of the stereo slide mount are brought into agreement). Relying on the verniers, here, the right and left film holder bars 15R and 15L can be correctly moved to right and left symmetrical positions to accomplish the matching of the right and left pictures. Here, the number of division and numerical expression of the verniers are only one of the examples, and the verniers may be graduated, for example, from 0 to 8 from the inner sides toward the outer sides.

To adjust the pitch of the films, the films and the cover frame 1 are mounted on the base frame 11, and the thus obtained stereo slide mount is loaded in the stereo slide viewer to view a stereo image and to judge the offset amount required for the films. Then, the cover frame 1 and the films are removed from the base frame 11 to adjust the pitch between the film holder bars 15R and 15L. When an optimum result is not obtained through one time of adjustment, the adjustment is repeated until an optimum result of adjustment is accomplished.

Depending on the photographed condition of the subject on the pictures, further, it may be often difficult to grasp the feeling of distance of the stereo image relative to the stereo window. In such a case, the feeling of distance can be easily detected by using a collimation pattern mask that is described below.

A collimation pattern mask 31 shown in FIG. 4 has a figure similar to the cover frame 1, and portions other than the right and left transparent windows 32R and 32L are coated with a light-shielding coating material or are formed of a colored resin so will not to transmit light.

The transparent windows 32R, 32L, pin-holes 33 and recesses 34 have sizes and positions same as those of the cover frame 1, and the same collimation patterns CP comprising chiefly a plurality of vertical lines are printed on the back surfaces of the transparent windows 32R and 32L (surfaces contacting to the films). These surfaces are subjected to the anti-Newton ring treatment to make the surfaces finely rugged or corrugated so will not to come in contact with the films.

Referring to FIG. 4b, the surfaces of the transparent windows 32R and 32L are slightly recessed compared to the peripheries thereof to keep the transparent windows 32R and 32L away from the wall surfaces of the mount slot of the stereo slide viewer (not shown), so that the transparent windows 32R and 32L will not be scarred.

The base frame 11 on which the collimation pattern mask 31 is mounted is inserted in the mount slot of the stereo slide viewer, and the perspective feeling of an image relative to the image of the collimation patterns CP of the collimation pattern mask 31 is observed through eyepieces of the stereo slide viewer. The pitch between the films is so adjusted that the image appears on the same plane as the collimation patterns CP or at the back of the collimation patterns CP and, then, the collimation pattern mask 31 is removed from the base frame 3 and, instead, the cover frame 1 is mounted to complete the stereo slide mount having an optimum pitch between the films.

Next, described below is a stereo camera for recording, onto the films, a guide number corresponding to a numerical value of the verniers of the stereo slide mount depending on the shooting distance, in order to facilitate the adjustment of pitch between the films.

Figure 5:
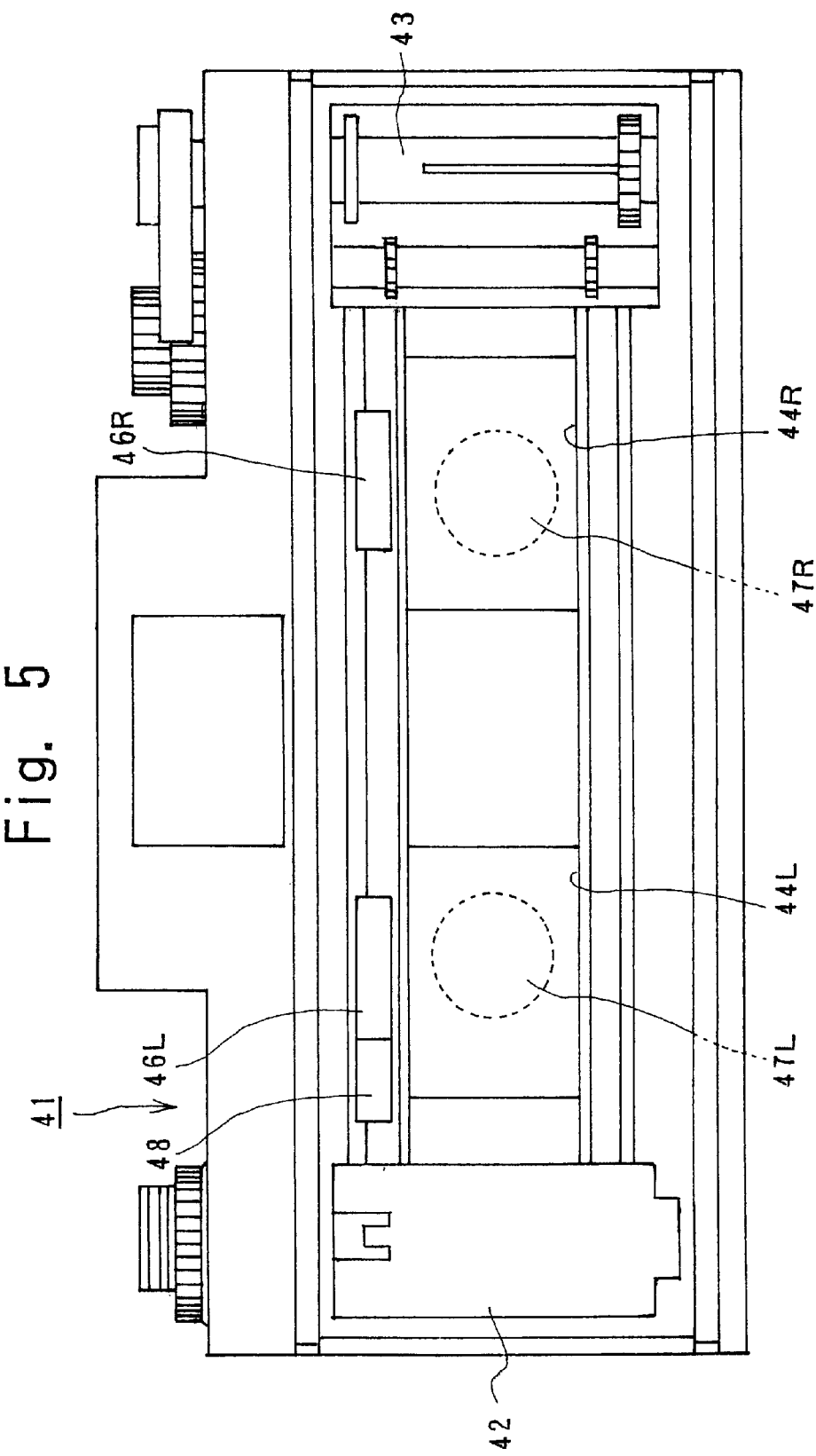
FIG. 5 is a back view of a stereo camera in a state where a back cover is removed.

FIG. 5 illustrates a stereo camera 41 in a state where a back cover is removed. Like in a general camera, the 135-type film is loaded in a Patrone-loading chamber 42 at the left end of the body. An end of the 135-type film is anchored to a film-winding shaft 43 to wind up the film on the film-winding shaft 43. A pair of right and left photographing windows 44R and 44L are formed between the Patrone-loading chamber 42 and the film-winding shaft 43.

A film guide 45 on the upper side of the film running passage is provided with frame number exposure devices 46R and 46L for projecting a frame number and the right and left discrimination characters onto areas outside the pictures on the films. Further, a guide number exposure device 48 is provided over the left photographing window 44L to project a guide number based on the amount of adjusting the focal points of the photographing lenses 47R and 47L.

Like a generally employed data recorder for recording the date and photographing data, the frame number exposure devices 46R, 46L and the guide number exposure device 48 may cause the LEDs to emit light being interlocked to the shutter in order to project light bearing numerals and characters. These devices may be provided on the back cover of the stereo camera to emit light from the back surfaces of the films.

Figure 6:
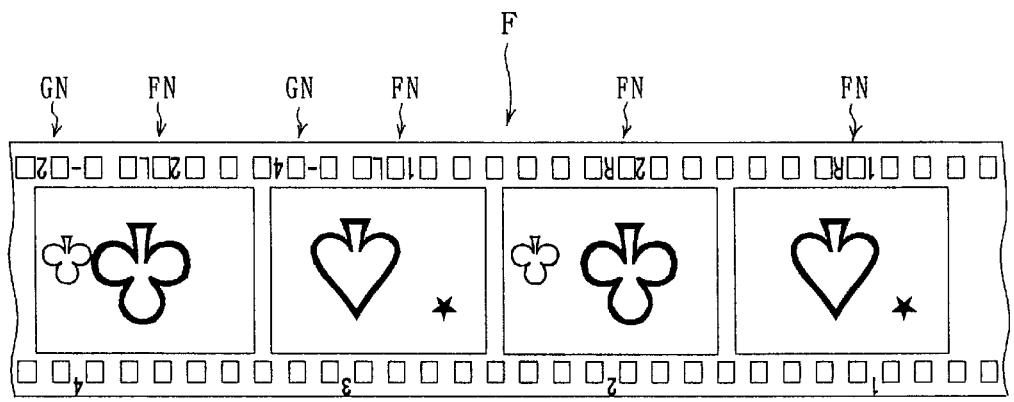
FIG. 6 is a front view of a film strip recording guide numbers.

FIG. 6 illustrates a film strip F photographed by using the stereo camera 41. Frame numbers are recorded on the edge on the upper side of the pictures in order of 1R, 2R, 1L, 2L, - - - , and guide numbers of the stereo slide mount corresponding to the focusing distances are indicated on the upper side of the right pictures 1R, 2R, - - - .

Described below is a distance between the optical axes of the right and left photographing lenses of the stereo camera. When the subject is infinitely distant, light from an infinite point falls in parallel with the optical axes of the light and left photographing lenses. Therefore, the pitch of the subject at an infinite point on the right and left photographed pictures is equal to the distance between the optical axes of the photographing lenses.

When the distance between the optical axes of the right and left photographing lenses of the stereo camera is equal to the pitch between the right and left pictures, the pitch between the subjects at an infinite point becomes equal to the pitch between the right and left pictures. When the films shooting the subject at an infinite point are mounted on the stereo slide mount in a state of zero offset (state where verniers are set to 0 as shown in FIG. 3b), the pitch between the subjects at an infinite point becomes equal to the pitch between the windows of the stereo slide mount, and the image of the subject at an infinite point and the stereo window appear at an infinite point.

On the pictures photographed by using the stereo camera, further, the pitch of the subject in a close range is expanded to be larger than the pitch of the subject at an infinite point. In a state where the films are turned by 180 degrees so as to be mounted on the stereo slide maintaining an erect image, the pitch of the subject in a close range is contracted to be shorter than the pitch of the subject at an infinite point.

Therefore, the film holder bars must be moved toward the positive direction to expand the pitch of the subject in a close range, so that the whole image of the subject in the pictures appears farther than the stereo window.

That is, in a stereo camera in which the distance between the optical axes of the right and left photographing lenses is equal to the pitch between the right and left pictures, the range of not smaller than 0 of the verniers of the stereo slide mount is used, and the offset adjustment range of the negative side is not utilized to a sufficient degree. However, if the distance between the optical axes of the right and left photographing lenses is set to be smaller than the pitch between the right and left pictures, the negative-side range of the verniers of the stereo slide mount can be utilized.

Figure 7:
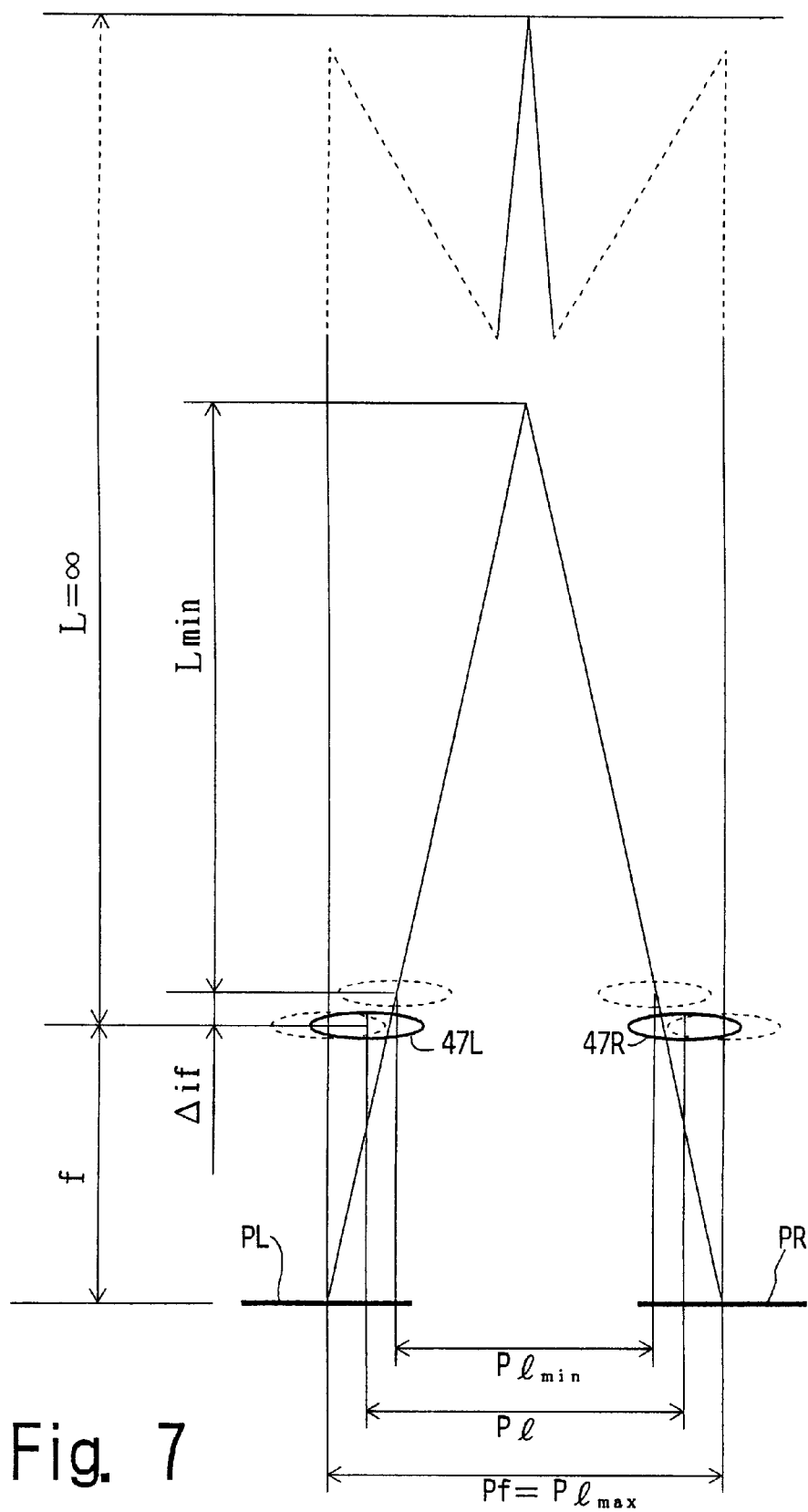
FIG. 7 is a view illustrating a relationship between the pitch across the pictures and the distance across the optical axes of the photographing lenses of the stereo camera; and Chart 1 shows in comparison the focusing distances of the stereo camera and the graduates of verniers on the stereo slide mount.

Described below with reference to FIG. 7 is how to set the distance between the optical axes.

Here, it is presumed that:

Distance to the subject—L

Focal distance of the photographing lens—f

Moving amount of the lens in the direction of optical axis due to focal point adjustment—$\Delta if$ Distance between the optical axes of the right and left photographing lenses—Pl Distance between the centers of the right and left pictures—Pf and that:

Focal distance of the photographing lens f=36 (mm),

Pitch between the right and left pictures Pf=film perforation pitch×14=4.735×14 =66.29 (mm).

When the distance L to the subject is infinite, light from an infinite point falls in parallel with the optical axes of the right and left photographing lenses 47R and 47L. When the distance Pl between the optical axes of the right and left photographing lenses 47R and 47L is Plmax (66.29 mm) which is equal to the distance Pf between the centers of the right and left pictures PR and PL, the photographing ranges of the right and left photographing lenses come into agreement at an infinite point, and the distance between the centers of the pictures of the subject at an infinite point comes into agreement with the distance Pf (66.29 mm) between the centers of the right and left pictures.

The distance Pl between the optical axes of the right and left photographing lenses is calculated to be, Moving amount of the lens in the direction of optical axis $\Delta if = f^2/(L-f)$, Magnification of projection of the lens $r=(\Delta if+f)/L$, Pl=Pi/(1+r)—where Pi is a pitch between the pictures of the subject at a focusing distance, and, hence, if the shortest photographing distance Lmin of the photographing lens is, for example, 600 mm, then, $\Delta if=36^2/(600-36)=2.2979$ (mm), r=(2.2979+36)/600=0.06383

If a distance between the optical axes is set to an intermediate value between the distance Plmax=66.29 mm across the optical axes at which the photographing ranges of the right and left photographing lenses come into agreement at an infinite point and the distance Plmin=62.313 mm across the optical axes at which the photographing ranges of the right and left photographing lenses come into agreement in the shortest range, then, the pitch of the subject at the focusing distance becomes smaller than the pitch of the pictures on the films shot in a range in which the position of delivering the photographing lenses is between the position of an infinite point and the intermediate position.

In this case, if the films are mounted being turned by 180 degrees, the pitch of the subject becomes larger than the pitch of the picture. In order to collect parallax, therefore, the films are offset in the negative direction to decrease the pitch of the subject, utilizing the negative-side range of the verniers. The distance between the optical axes needs not be strictly set to be an intermediate value but may be near to it including a margin of some degree.

The focusing distance L at which the stereo window of the stereo slide mount appears at a distance equal to the subject can be expressed by a relation, r=(Pi−Pl)/Pl—magnification of projection of photographing lens, $\Delta if=f \times r$, L=($\Delta if+f$)/r Here, if the offset amount of the pitch between the films is denoted by Po, then, $$r=(Pi-Pl)/Pl=(Pf+Po-Pl)/Pl$$

If the distance between the optical axes of the stereo camera 41 is 63.9 mm, and if the verniers of the stereo slide mount are set to +1, and the films are offset toward the outer sides (+direction) by 0.25 mm to widen the pitch between the films by 0.5 mm, then, r=(66.29+0.5−63.9)/63.9=0.045227

$\Delta if=36 \times 0.045227=1.62817$

L=(1.62817+36)/0.045227≈832 (mm)

By using the stereo slide mount on which the films are mounted while setting the verniers to +1 as described above, the picture of subject at a distance of 832 mm and the stereo window appear at an equal distance.

When the verniers of the stereo slide mount are set to −4 to shorten the film pitch by 2.0 mm, r=(66.29−2.0−63.9)/63.9=0.006103

$\Delta if=36 \times 0.006103=0.21972$

L=(0.21972+36)/0.006103≈5935 (mm)

and the picture of subject at a distance of about 6000 mm and the stereo window appear at an equal distance.

The attached chart 1 shows in comparison the numerals of the verniers of the stereo slide mount and the focusing distance of the stereo camera having a distance between the optical axes of 63.9 mm. As shown in the chart 1, if the films are mounted while adjusting the verniers of the stereo slide mount to −4, the stereo window appears nearly at an equal distance as the subject at a focusing distance of about 6000 mm. If the verniers are adjusted to 0, the stereo window appears nearly at an equal distance as the subject at a focusing distance of about 1000 mm.

It would be natural if the stereo window appears closer than the image of the subject like when a person views the scenery outside the house from the indoors through a window of the house, but it would be unnatural if the image of the subject and the stereo window appear at an equal distance. Therefore, favorable results are obtained in many cases when the subject appears slightly farther than the stereo window.

In practice, therefore, preferred results are obtained when the focusing distances corresponding to the guide numbers of the verniers are slightly corrected toward the farther side as given in the column of "CORRECTED FOCUSING RANGE (mm)" on the right side of the column "FOCUSING DISTANCE (mm)" in the chart 1. That is, the films shot by setting the focusing distance to be from about 1100 mm to 1400 mm may be mounted while adjusting the verniers to 0, so that the subject at the focusing distance appears slightly farther than the stereo window, which is easy to view.

A data table comparing the numerals of the above-mentioned column of "CORRECTED FOCUSING RANGE" and the guide numbers, is stored in the guide number recording unit of the stereo camera 41, and the focusing distance of the camera is found from the amount of delivery of the photographing lenses by using an electric position detector (not shown) that detects the amount of delivery of the photographing lenses 47R and 47L. Or, in a stereo camera of the automatic focusing type, the focusing distance is found from the distance data measured by the distance-measuring circuit. Then, a guide number corresponding to the focusing distance is read out while making a reference to the column "CORRECTED FOCUSING RANGE" in the data table, and the guide number exposure device 48 is actuated simultaneously with the shutter-on to project the guide number onto the films.

To mount the photographed films, the verniers of the base frame 11 are adjusted to the same numerical value as the guide number recorded on the edges of the films and, then, the films are mounted to complete a stereo slide mount having a good stereo effect in which the pitch of the subject at the focusing distance is slightly larger than the pitch between the windows.

The chart 1 shows the data related to the focusing distances of when the focal distance is 36 mm. In the stereo camera mounting the zoom lenses, means is provided for detecting the position for adjusting the magnification of projection of the zoom lenses, the control unit is so constituted as to calculate the guide number data based on the focal distance that varies upon adjusting the magnification of projection in accordance with the above-mentioned formulas and based on the focusing distance, in order to cope with a change in the focal distance caused by the zooming and to record a guide number that indicates a proper film pitch irrespective of the magnification of projection.

According to the stereo slide mount of the present invention as described above, the film holder bars on the base frame are slid in the right-and-left direction to adjust the pitch between the films for the pitch between the right and left windows of the stereo slide mount, and the offset amount of the films is read by way of verniers. Therefore, the right and left films can be correctly adjusted to symmetrical positions, and the pitch between the films can be easily and correctly adjusted.

According to the stereo camera of the present invention, further, a guide number corresponding to the graduate of the verniers of the stereo slide mount is projected onto the films. Upon mounting the films by adjusting the verners of the base frame based on the guide number recorded on the films, therefore, the films are mounted maintaining a proper pitch, and the mounting operation is conducted very easily.

The present invention is not limited to the above-mentioned embodiment only but can be modified in a variety of ways without departing from the technical scope of the invention and, hence, the present invention encompasses even those modified embodiments, as a matter of course.

I claim:

1. A stereo slide mount comprising a base frame and a cover frame, each having a pair of windows with lateral widths for viewing films with perforations having pictures thereon, wherein the lateral widths of the pair of windows are set to be narrower than lateral widths of the pictures of the films, horizontal guide grooves are formed over or under each of the pair of windows of the base frame, film holder bars having bosses formed thereon for engagement with the perforations of the films, are fitted into each of the guide groves in a manner that a gap between the film holder bars can be adjusted, and the film holder bars and the base frame are provided with graduates of different pitches thereby to constitute verniers, so that offset amounts of the film holder bars in a right-and-left direction can be read relying on the verniers.

2. A stereo slide mount according to claim 1, wherein bearing holes are formed at positions opposed side surfaces of the film holder bars of said base frame, and cam shafts are turned by being inserted in said shaft holes in order to push and slide the film holder bares of which the guide grooves are engaged with cams.

3. A stereo slide mount according to claim 1, wherein a pair of right and left bosses are formed on each of said film holder bars, the right and left bosses maintaining a pitch which is the same as a pitch between the perforations at both right and left ends of the films so as to be engaged with the perforations at both the right and left ends of the films.

4. A stereo slide mount according to claim 1, wherein the cover frame or the base frame can be folded along the vertical center thereof.

5. A stereo slide mount according to claim 1, wherein both ends of the base frame and the cover frame are formed in an arcuate shape or in a shape close to an arc.

6. A stereo slide mount according to claim 1 or 5, wherein a collimation pattern mask is mounted on said base frame, said collimation pattern mask having a shape the same as said cover frame and bearing collimation patterns, so that the relative distance to the stereo image can be observed with respect to the collimation pattern.

7. A stereo slide mount comprising:
   a base frame having a right and left base window;
   a right horizontal guide groove formed adjacent the right base window;
   a left horizontal guide groove formed adjacent the left base window;
   right main graduates formed on said base frame adjacent said right horizontal guide groove;
   left main graduates formed on said base frame adjacent said left horizontal guide groove;
   a right film holder bar placed within said right horizontal guide groove, said right film holder bar having right vernier graduates formed thereon, whereby said right film holder bar is permitted to slide longitudinally within said right horizontal guide groove;
   a left film holder bar placed within said left horizontal guide groove, said left film holder having left vernier graduates formed thereon, whereby said left film holder bar is permitted to slide longitudinally within said left horizontal guide groove; and
   a cover frame having a right and left cover window mating with said base frame,
   whereby a pitch between said right and left film holder bars may be adjusted utilizing the right and left main graduates and the right and left vernier graduates.

8. A stereo slide mount as in claim 7 further comprising:
   a right hole formed in said base frame adjacent said right horizontal guide groove; and
   a left hole formed in said base frame adjacent said left horizontal guide groove;
   whereby a cam may be inserted into said right hole and said left hole to adjust said right and left film holder bars.

9. A stereo slide mount as in claim 8 further comprising:
   a right bearing hole formed in said base frame and placed within said right hole;

a left bearing hole formed in said base frame and placed within said left hole;

a cam shaft adapted to fit within either of said right or left bearing holes; and a cam placed on said cam shaft and adapted to fit within either said right and left holes.

10. A stereo slide mount as in claim 7 further comprising:

a grooved hinge portion placed in said cover and dividing the right and left cover windows.

11. A stereo slide mount as in claim 7 wherein:

the base frame and the cover frame have arcuate shaped ends.

12. A stereo slide mount as in claim 7 further comprising:

a collimation pattern mask mounted on said base frame.

13. A stereo slide mount as in claim 12 wherein:

said collimation pattern mask has a collimation pattern comprising a plurality of vertical lines.

14. A stereo slide mount comprising:

a base frame having a right and left base window;

a right horizontal guide groove formed adjacent the right base window;

a left horizontal guide groove formed adjacent the left base window;

right main graduates formed on said base frame adjacent said right horizontal guide groove;

left main graduates formed on said base frame adjacent said left horizontal guide groove;

a right film holder bar placed within said right horizontal guide groove, said right film holder bar having right vernier graduates formed thereon, whereby said right film holder bar is permitted to slide longitudinally within said right horizontal guide groove;

a left film holder bar placed within said left horizontal guide groove, said left film holder having left vernier graduates formed thereon, whereby said left film holder bar is permitted to slide longitudinally within said left horizontal guide groove;

a right hole formed in said base frame adjacent said right horizontal guide groove;

a left hole formed in said base frame adjacent said left horizontal guide groove;

a right bearing hole formed in said base frame and placed within said right hole;

a left bearing hole formed in said base frame and placed within said left hole;

a cam shaft adapted to fit within either of said right or left bearing holes;

a cam placed on said cam shaft and adapted to fit within either said right and left holes, whereby said cam may be inserted into said right hole and said left hole to adjust said right and left film holder bars;

a cover frame having a right and left cover window mating with said base frame; and a grooved hinge portion placed in said cover and dividing the right and left cover windows, whereby a pitch between said right and left film holder bars may be adjusted utilizing the right and left main graduates and the right and left vernier graduates.

15. A stereo slide mount as in claim 14 further comprising:

a collimation pattern mask mounted on said base frame, whereby said collimation pattern mask aids in adjusting a film in the stereo slide mount.

16. A stereo slide mount comprising:

a base frame having a right and left base window;

a right horizontal guide groove formed adjacent the right base window;

a left horizontal guide groove formed adjacent the left base window;

right main graduates formed on said base frame adjacent said right horizontal guide groove;

left main graduates formed on said base frame adjacent said left horizontal guide groove;

a right film holder bar placed within said right horizontal guide groove, said right film holder bar having right vernier graduates formed thereon, whereby said right film holder bar is permitted to slide longitudinally within said right horizontal guide groove;

a left film holder bar placed within said left horizontal guide groove, said left film holder having left vernier graduates formed thereon, whereby said left film holder bar is permitted to slide longitudinally within said left horizontal guide groove; and a collimation pattern mask having a right and left pattern window placed on said base frame, whereby a pitch between said right and left film holder bars may be adjusted utilizing said collimation mask so that an image on a film appears in the same plane as a pattern on said collimation pattern mask.

* * * * *